(12) United States Patent
Niedermann et al.

(10) Patent No.: US 8,308,145 B2
(45) Date of Patent: Nov. 13, 2012

(54) APPARATUS FOR DELIVERING HUMIDIFIED AIR TO A SURROUNDING SPACE

(76) Inventors: Dirk Niedermann, Bloomingdale, IL (US); Kelvin Li, Kowloon (HK)

( * ) Notice: Subject to any disclaimer, the term of this patent is extended or adjusted under 35 U.S.C. 154(b) by 435 days.

(21) Appl. No.: 12/592,013

(22) Filed: Nov. 18, 2009

(65) Prior Publication Data

US 2011/0115107 A1 May 19, 2011

(51) Int. Cl.
*B01F 3/04* (2006.01)
(52) U.S. Cl. ............. 261/78.2; 261/119.1; 261/DIG. 48
(58) Field of Classification Search ............. 261/78.2, 261/119.1, DIG. 48
See application file for complete search history.

(56) References Cited

U.S. PATENT DOCUMENTS 7,467,786 B2 * 12/2008 Jae-Bong et al. ............. 261/81

* cited by examiner

*Primary Examiner* — Robert A Hopkins
(74) *Attorney, Agent, or Firm* — Wood, Phillips, Katz, Clark & Mortimer

(57) ABSTRACT

An apparatus for delivering humidified air to a surrounding space and having a housing defining a space within which incoming air is treated, a receptacle for a supply of fluid, and an outlet. A plurality of operating components are supported by the housing, including a nebulizer that causes fluid in the receptacle to become entrained in incoming air. The treated air flows through the housing outlet to the surrounding space. The nebulizer operable by at least one electronic component that generates heat as the nebulizer is operated. The apparatus further has a heat sink assembly on the housing in heat exchange relationship with the at least one electronic heat generating component. The heat sink assembly is: a) cooled by air moving through the housing space; and b) not directly exposed to fluid in the receptacle.

20 Claims, 10 Drawing Sheets

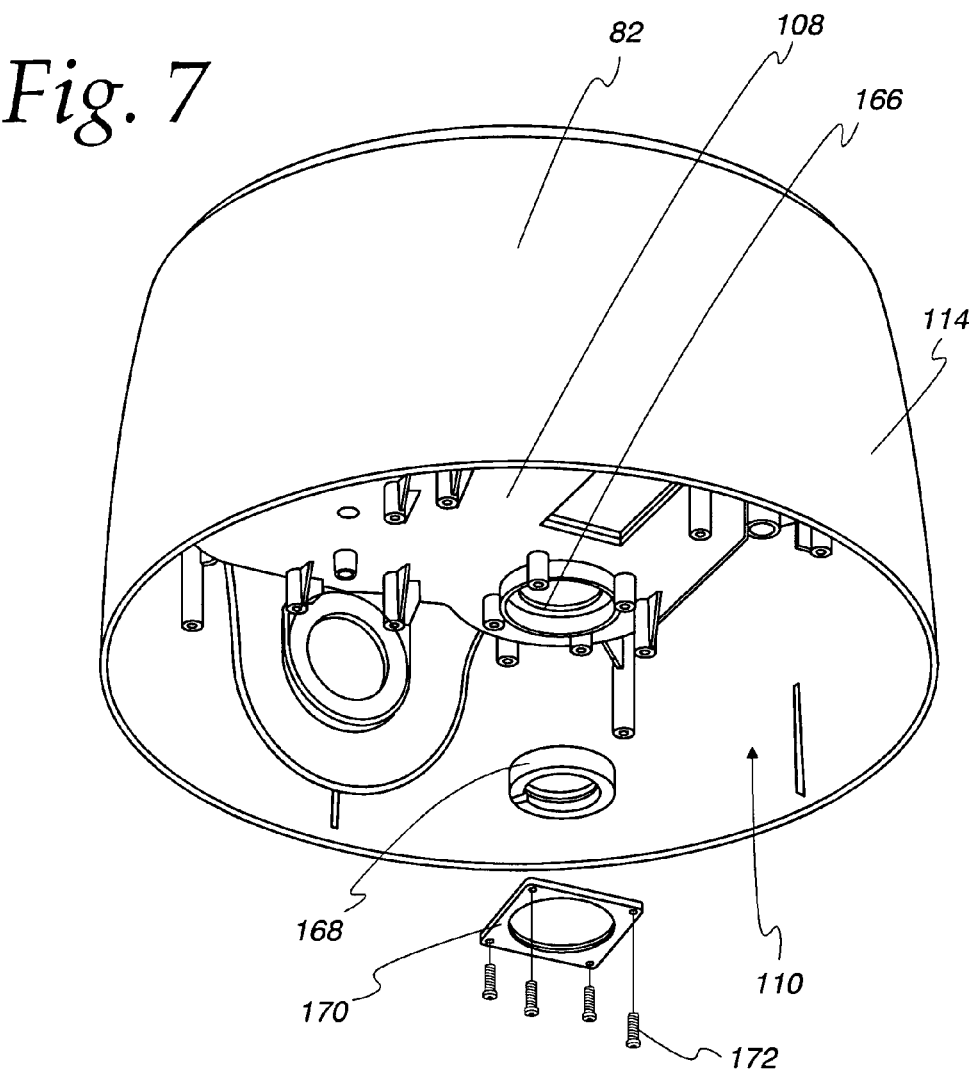

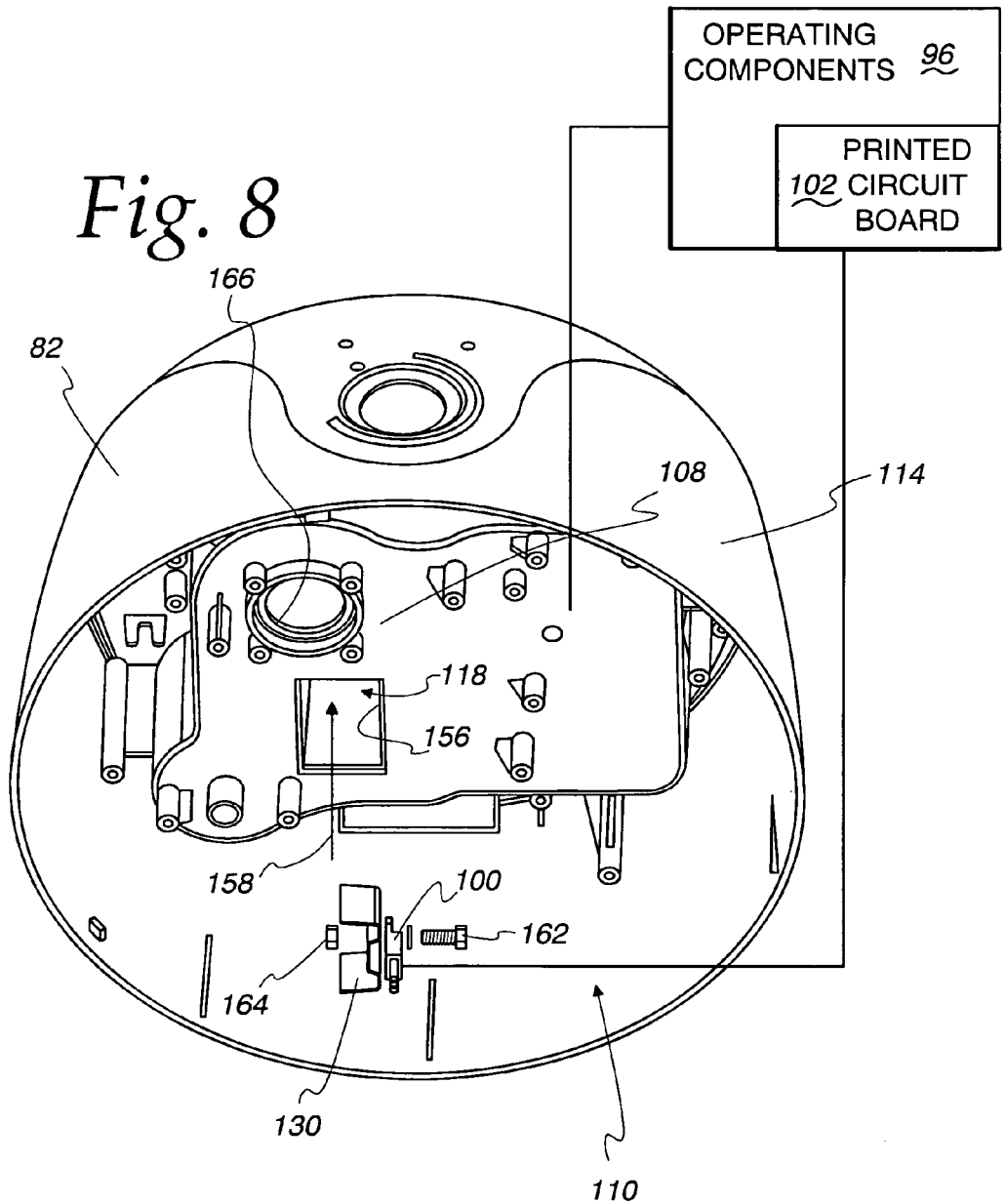

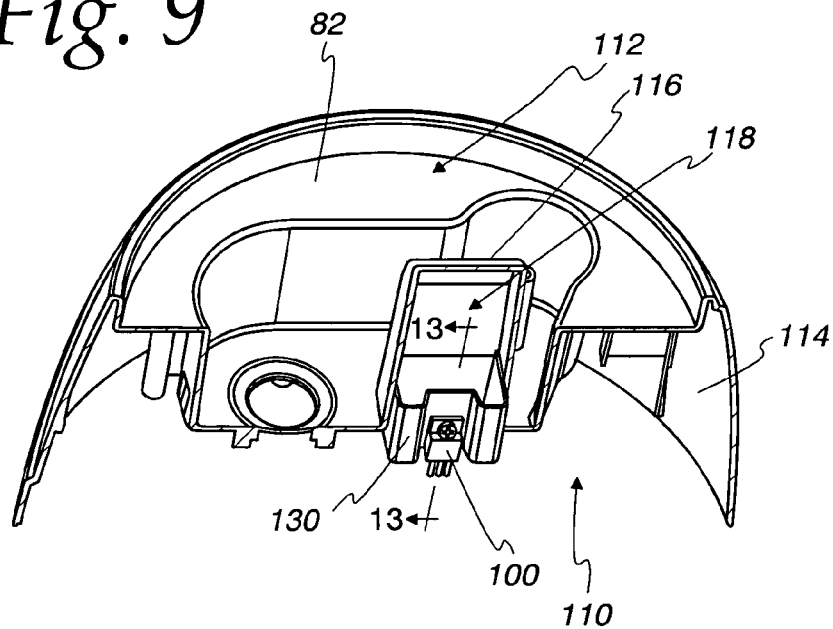
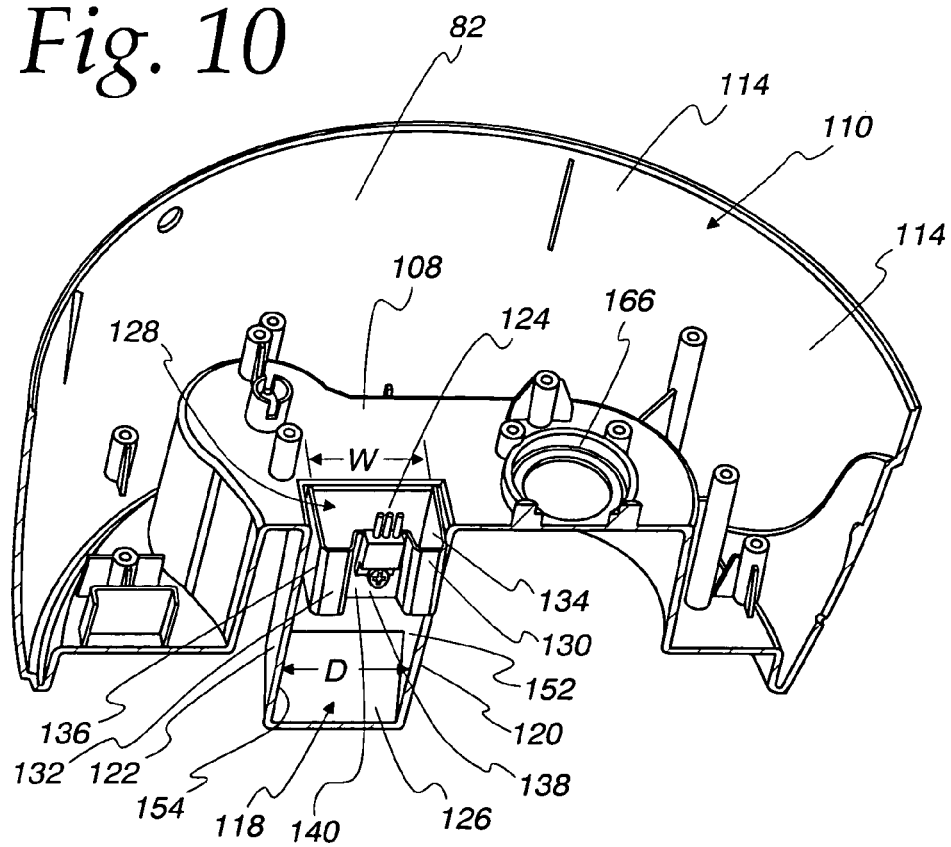

APPARATUS FOR DELIVERING HUMIDIFIED AIR TO A SURROUNDING SPACE

BACKGROUND OF THE INVENTION

1. Field of the Invention

This invention relates to an air treatment apparatus and, more particularly, to an apparatus for delivering humidified air to a space within which the apparatus resides.

2. Background Art

There is a multitude of apparatus currently in existence that draw in environmental air, treat the air by causing water particles to be entrained in the air, and direct the treated air back into the surrounding space. While many different technologies exist, the most popular portable design employs a nebulizer that is vibrated at high frequencies to generate small water particles that, by becoming entrained in incoming air, create humidified air that is dispersed to the environment around the apparatus.

The assignee herein currently offers a line of the above type of humidifiers. Exemplary forms are shown in U.S. Pat. No. 7,441,756. The designs shown in U.S. Pat. No. 7,441,756, while appropriate for virtually any individual that might benefit from the presence of humidified air, are particularly attractive to younger persons. These designs encourage purchase for, and use by, such young persons, which may be particularly important in the event that humidification of environmental air will address a medical condition that such individuals may have.

Heretofore, such apparatus have generally been made with a housing defining a receptacle for a supply of water. A nebulizer is placed within the receptacle to be directly exposed to a supply of water contained within the housing.

Typical nebulizer constructions are operated using electronic components. Commonly, such components will include a transistor that is electrically connected to a printed circuit board. During operation, the transistors are prone to generating a significant amount of heat that must be dissipated to avoid compromised, or failed, operation of the transistor, and thus the apparatus.

Heretofore, heat sinks have been provided that are in heat exchange relationship with these transistors. Such heat sinks commonly have a metal component that is placed in heat exchange relationship with the transistor to cause a heat transfer from the transistor to the metal component. The metal component is cooled by a supply of water in the apparatus that is added to air during the treatment thereof. The metal component is commonly made from aluminum. In most designs, for aesthetic purposes, the metal component will be painted, at least over the area that is exposed to view by the user, as when a container/tank is separated as a supply of water is introduced into, or replenished in, the housing.

The above types of heat sinks have worked effectively in terms of maintaining the temperature of the transistors in a safe and workable range. However, by reason of the metal components being exposed to water, and chemicals commonly found therein, there is a tendency of the paint on the exposed surfaces of the metal components to separate progressively, as in the form of small flakes. With a dark color of paint, these flakes will float in a visible fashion within the water supply. This detracts significantly from the appearance of the product and may be a condition that is extreme enough that potential consumers may view the same as a product defect and tend away from such a product.

Even if not painted, exposed metal surfaces may become corroded through lengthy water immersion. This is detrimental primarily from the standpoint of aesthetics.

Additionally, there may be lead content in the paint used on the exposed metal components. This is particularly a problem given that such apparatus are often made for use by young children. Accordingly, it may be difficult to construct such apparatus to meet industry guidelines on lead limits for children's products. Even if the lead limits can be adequately controlled, it is more preferable if direct exposure to any lead can be avoided. This minimizes the likelihood of there ultimately being any injury that can be argued to be attributable to lead exposure and any potential liability on the part of the manufacturer as a result thereof.

The industry continues to contend with the above problems since there are no known viable alternative designs that adequately address these problems.

SUMMARY OF THE INVENTION

In one form, the invention is directed to an apparatus for delivering humidified air to a surrounding space. The apparatus consists of:

a) a housing defining at least one space within which incoming air is treated;

b) a receptacle for a supply of fluid; and c) an outlet through which treated air is supplied to the surrounding space. A plurality of operating components is supported by the housing, including a nebulizer that causes fluid in the receptacle to become entrained in incoming air. The treated air with the entrained fluid flows through the housing outlet to the surrounding space. The nebulizer is operable by electronic components including at least one electronic component that generates heat as the nebulizer operates. The apparatus further includes a heat sink assembly on the housing, in heat exchange relationship with the at least one electronic heat generating component. The heat sink assembly is: a) cooled by air moving into and through the at least one housing space; and b) not directly exposed to fluid in the receptacle.

In one form, the apparatus is provided in combination with a supply of water in the housing receptacle.

In one form, the at least one electronic component is a transistor electrically connected to a printed circuit board.

In one form, the transistor and heat sink assembly have complementary surfaces that are directly engaged over a substantial area to facilitate heat exchange between the transistor and heat sink assembly.

In one form, the heat sink assembly includes a bracket with a wall with first and second sides. The one electronic component is attached to the first side of the bracket wall. There is an air flow space at the second side of the bracket wall.

In one form, the housing defines an air flow passage within which the bracket resides.

In one form, the air flow passage is bounded by spaced flow guide walls and the heat sink assembly spans substantially fully between the spaced flow guide walls.

In one form, the bracket has an overall U-shaped configuration with spaced legs that are located, one each, at the spaced flow guide walls.

In one form, the bracket has a "W" shape with spaced legs and the bracket wall to which the electronic component is attached extends transversely to the spaced legs.

In one form, the at least one electronic component is secured by a fastener to the bracket.

In one form, the at least one space has first and second chambers separated by a dividing wall. The air flow passage communicates incoming air from the first chamber to the second chamber. The heat sink assembly resides within the air flow passage.

In one form, the receptacle for the supply of fluid is defined on the dividing wall.

In one form, the nebulizer is mounted on the dividing wall.

In one form, the plurality of operating components includes an air moving mechanism in the first chamber that causes: a) incoming air to flow into and from the first chamber to the second chamber; and b) humidified air to flow from the second chamber to and through the housing outlet to the surrounding space.

In one form, the nebulizer bounds at least a part of the receptacle for the supply of liquid.

In one form, the dividing wall defines a recessed seat for the nebulizer.

In one form, the apparatus further includes a mounting plate that is secured to the dividing wall and captively maintains the nebulizer against the dividing wall within the recessed seat.

In one form, the housing further includes a bottom wall that bounds the first chamber in conjunction with the dividing wall.

In one form, the housing has an air inlet formed in the bottom wall.

The invention is further directed to an apparatus for delivering humidified air to a surrounding space. The apparatus has: a) a housing defining at least one space within which incoming air is treated; b) a receptacle for a supply of fluid; and c) an outlet through which treated air is supplied to the surrounding space. A plurality of operating components are supported by the housing, including a nebulizer that causes fluid in the receptacle to become entrained in incoming air. The treated air with the entrained fluid flows through the housing outlet to the surrounding space. The nebulizer is operable by electronic components including at least one electronic component that generates heat as the nebulizer operates. The apparatus further includes a heat sink assembly on the housing in heat exchange relationship with the at least one electronic heat generating component. The heat sink assembly: a) is cooled by air moving into and through the at least one housing space; and b) has no metal part directly exposed to fluid in the receptacle.

BRIEF DESCRIPTION OF THE DRAWINGS

FIG. 7 is a bottom, perspective view of the apparatus in FIG. 6 with a nebulizer and its mounting structure shown separated therefrom;

FIG. 8 is a bottom, perspective view of the apparatus in FIGS. 6 and 7 with a heat sink assembly shown separated therefrom;

FIG. 9 is a fragmentary, top, perspective view of the apparatus with the heat sink assembly in FIG. 8 in place;

FIG. 10 is a fragmentary view of the apparatus in the FIG. 9 state and from a bottom perspective;

DETAILED DESCRIPTION OF THE PREFERRED EMBODIMENT

Figure 1:
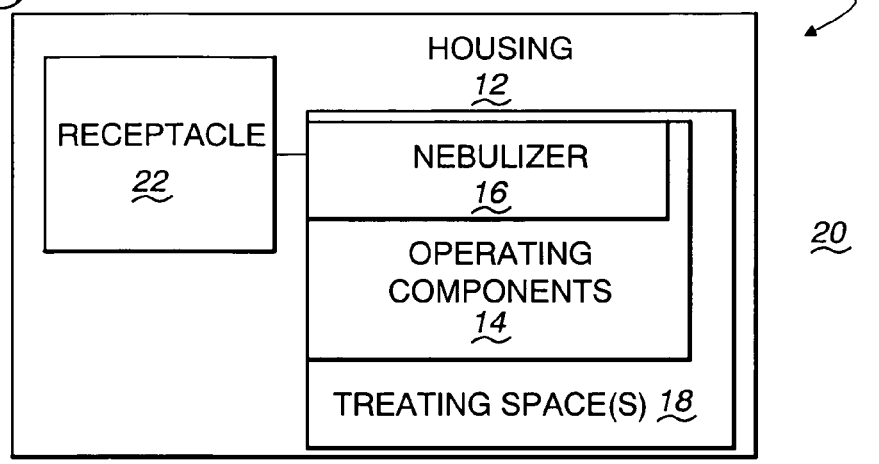
FIG. 1 is a schematic representation of an apparatus for delivering humidified air to a surrounding space according to the present invention.
Figure 2:
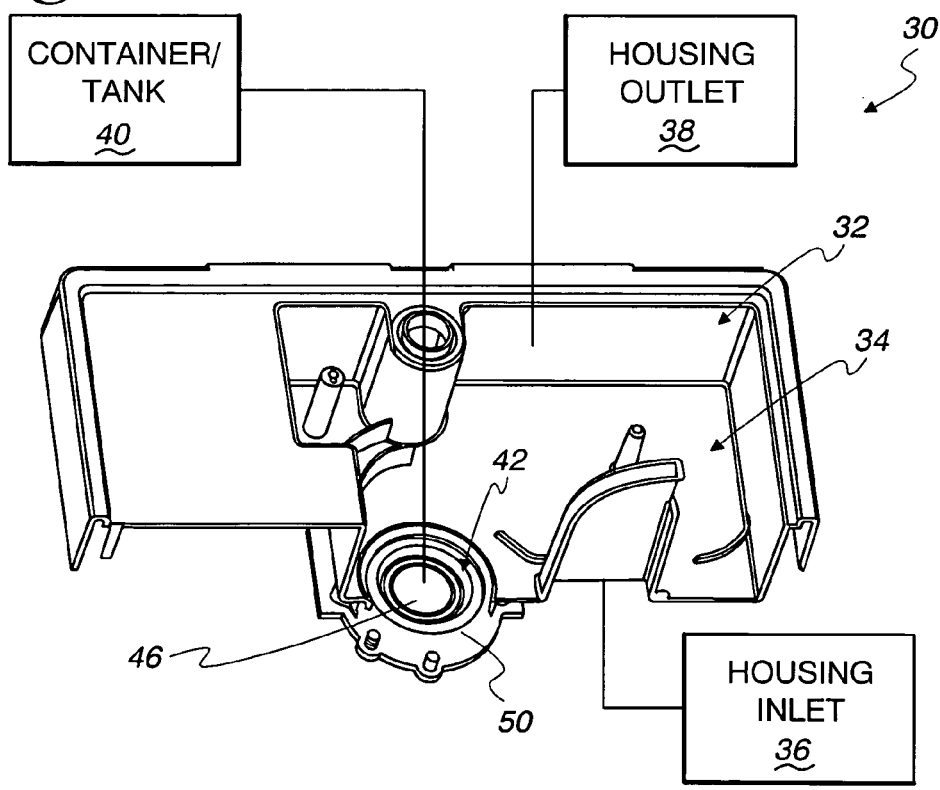
FIG. 2 is a partially schematic, fragmentary, top, perspective view of a conventional apparatus with heat sink structure incorporated therein to cool one or more electronic components.
Figure 3:
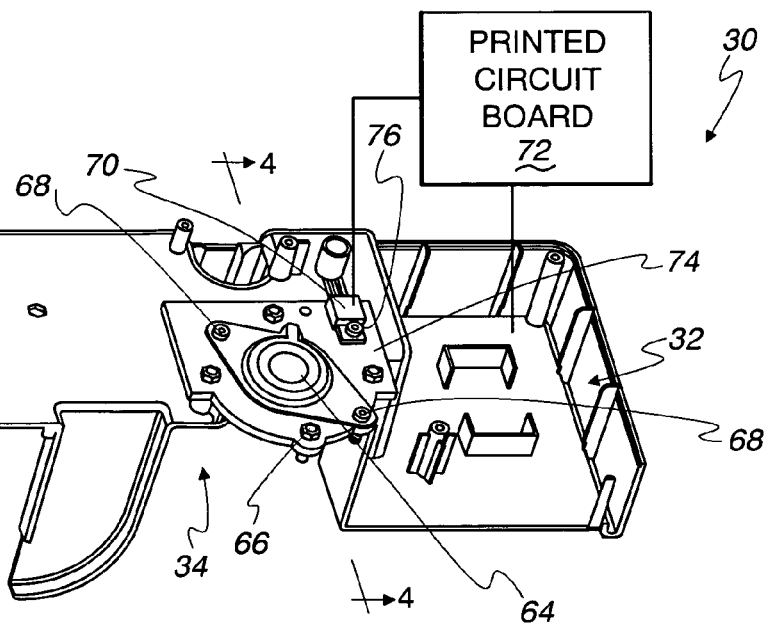
FIG. 3 is a bottom, perspective view of a portion of the apparatus in FIG. 2.
Figure 4:
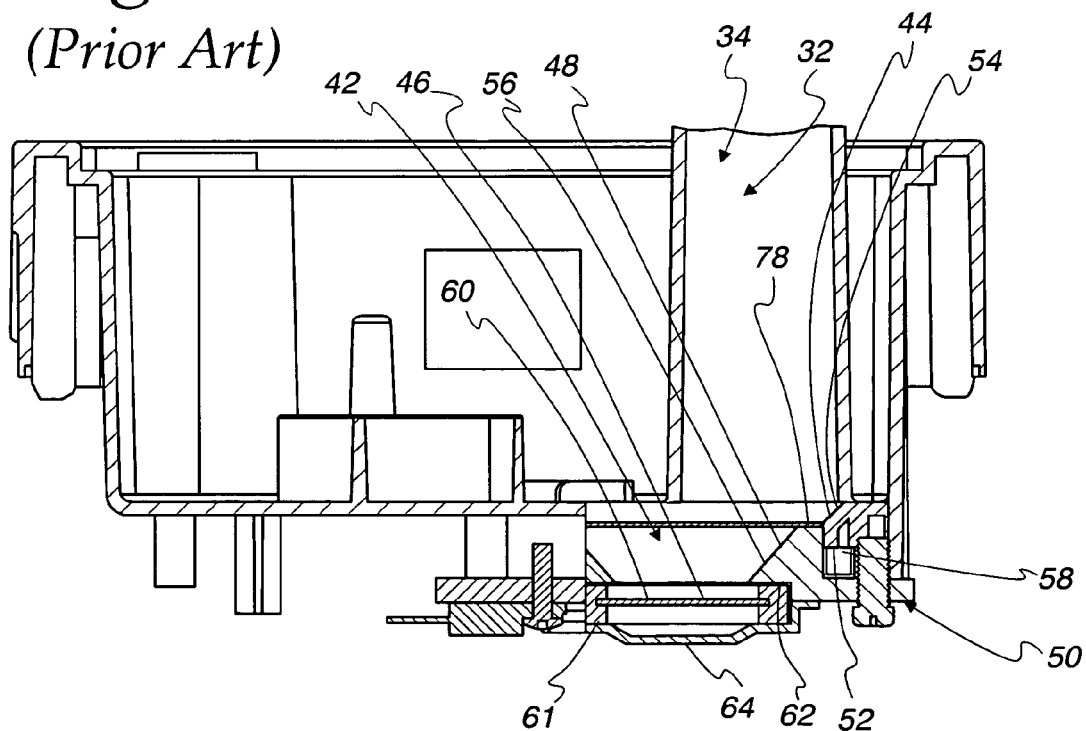
FIG. 4 is an enlarged, cross-sectional view of the apparatus taken along lines 4-4 of FIG. 3.
Figure 5:
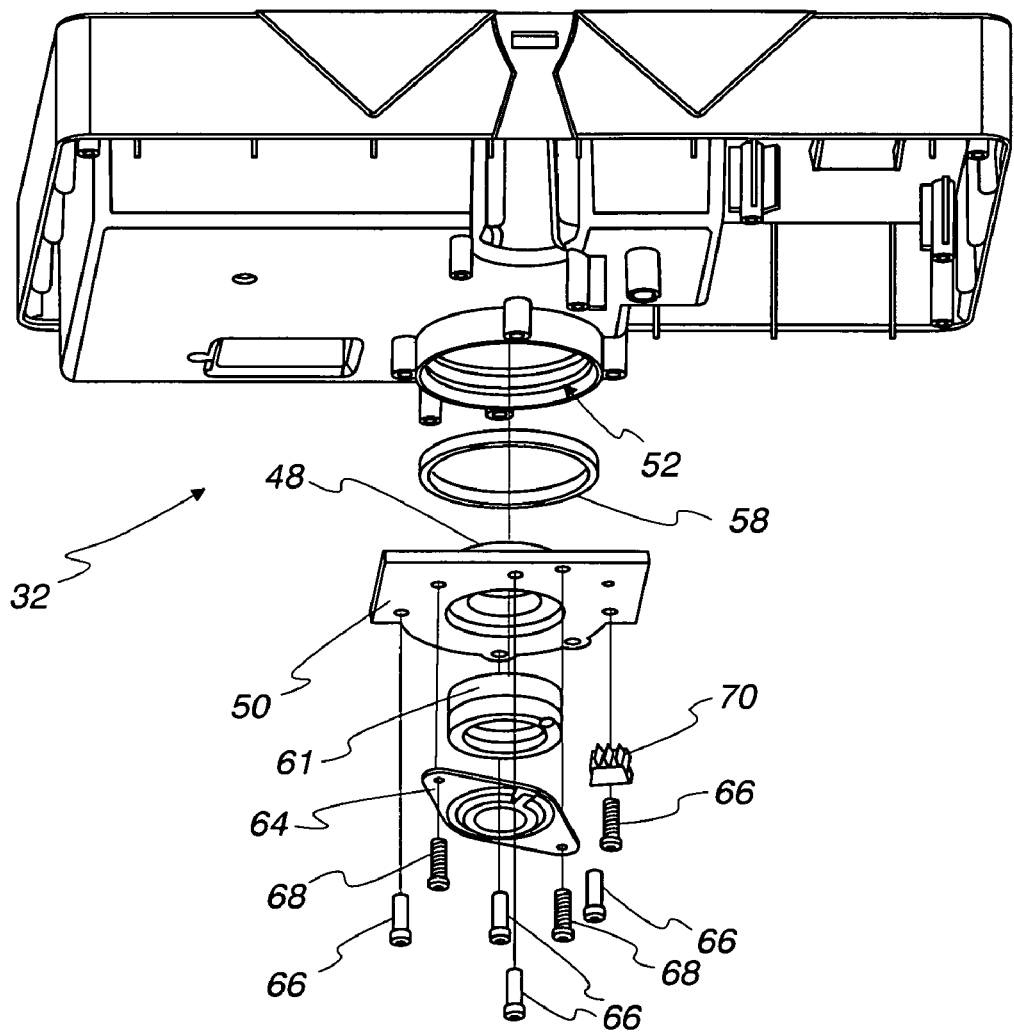
FIG. 5 is an exploded, bottom, perspective view of a part of the apparatus in FIGS. 2-4.

The present invention is directed to a type of air treating apparatus, as shown schematically at 10 in FIG. 1, consisting of a housing 12 supporting a plurality of operating components 14, including a nebulizer 16 that causes a fluid to become entrained in air controllably directed through at least one treating space 18 defined by the housing 12. Air from a surrounding space 20 is directed through the at least one treating space 18. The nebulizer 16 causes fluid in a receptacle 22 to be broken into small particles that become entrained in the air flowing through the at least one treating space 18. The resulting treated/humidified air is discharged from the housing 12 to the surrounding space 20.

One specific form of prior art apparatus, of the type described above, is shown at 30 in FIGS. 2-5. The apparatus 30 is operable generally as the apparatus 10, described above. More specifically, the apparatus 30 has a housing, corresponding to the housing 12, with a part thereof shown at 32 in FIGS. 2-5. The housing part 32 is the only part of the housing that needs to be described in any detail to understand the prior art construction pertinent to the present invention. The housing part 32 defines a space 34 through which atmospheric/surrounding air is directed between an inlet 36 and an outlet 38.

A refillable container/tank 40 is separably attached to the housing part 32. The container/tank 40 is used to controllably deliver water to a receptacle 42, within the space 34 and bounded in part by the housing part 32. The housing part 32 has a tapered annular wall 44 that funnels water downwardly to a nebulizer 46 at the bottom of the receptacle 42. A bottom portion of the receptacle 42 is bounded additionally by an annular wall 48 on a metal heat sink component 50 that nests within a complementary annular seat 52 defined by the housing wall 44.

The walls 44, 48 have surfaces 54, 56, respectively, that funnel water gravitationally to the bottom of the receptacle 42 and against the nebulizer 46. An annular seal 58, as of silicone, is interposed between the heat sink component 50 and the housing wall 44 to prevent migration of water between these components.

The nebulizer 46 has a main component 60 that is embedded in an annular, silicone seal 61 that nests within a downwardly opening, annular seat 62 on the heat sink component 50. A metal cover 64 is secured to the metal heat sink component 50 so as to captively maintain the nebulizer 46 in place.

The metal heat sink component 50 is secured to the bottom of the housing part 34 through threaded fasteners 66, with the metal cover 64 in turn secured to the metal heat sink component 50 through threaded fasteners 68.

The precise construction of the nebulizer 46 is not critical to the present invention. It suffices to say that the nebulizer 46 is operated by using a plurality of electronic components, including at least one transistor 70 connected to a printed circuit board 72. During operation of the nebulizer 46, the transistor 70 generates a significant amount of heat that must be dissipated. To accomplish this, the transistor 70 is facially engaged with the bottom surface 74 of the metal heat sink component 50 and secured thereto with a threaded fastener 76. Fluid in the receptacle 42 directly contacts, and cools, the metal heat sink component 50.

While this heat sink construction is effective in terms of maintaining the transistor 70 in a safe operating temperature range, it has some drawbacks.

More specifically, the tapered surface 56 that directly bounds the receptacle 42, and an annular stepped surface 78, at a transition location between the surfaces 54, 56, are both exposed to a user's view and fluid in the receptacle 42.

For aesthetic purposes, the surfaces 56, 78 are normally painted using a composition that may have a lead component. During operation and over time, the paint may fade, crack, and/or progressively separate in flakes which become distributed in a quantity of water that resides within the housing part 32.

The floating paint particles are undesirable from the standpoint of aesthetics and customer confidence. Further, any lead content in the paint presents potential health risks, particularly when the product is designed for use by young children.

Still further, the underlying metal material making up the component 50 may itself be prone to deterioration through extended exposure to water, as by corrosion. Typically, the metal heat sink component 50 will be a die cast aluminum part that is prone to these defects.

One specific form of the inventive apparatus 10 is shown in detail in FIGS. 6-13. It should be understood that this is but one exemplary form of the invention, with many variations thereof contemplated within the broad disclosure of FIG. 1. The apparatus 10, designed to deliver humidified air to the surrounding space 20, consists of the aforementioned housing 12, that is made up of a main housing part 82, a top housing part/container 84, and a bottom housing part/wall 86. The housing 12 defines at least one space, and in this case a treating space 18, through which air passes and is humidified. Air moves between an inlet 90 defined at the bottom housing part/wall 86, and an outlet 92 defined on the housing part/container 84. The main housing part 82 defines a receptacle at 94 for a supply of fluid, which is normally tap water that is controllably delivered from the housing part/container 84.

A plurality of operating components 96 are supported by the housing 12. The precise nature of these components 96 is not critical to the present invention. As noted above, the details of operation of one exemplary apparatus are described in co-owned U.S. Pat. No. 7,441,756, the disclosure of which is incorporated herein by reference. It suffices to say that the operating components 96 include a nebulizer 98 that is operated in conventional manner through certain other of the operating components 96, including a transistor 100 that is electrically connected to a printed circuit board 102. As also noted above, it is not necessary to explain how the components, including the transistor 100, mounted upon the printed circuit board 102, operate. It suffices to say that the nebulizer 98 has a component 104 that is vibrated at a high frequency, as a result of which a significant amount of heat is generated that must be dissipated. The nebulizer 98 causes fluid in the receptacle 94 to break into particles that are entrained in the air passing through the treating space 18.

During operation, air from the surrounding space 20 is drawn through the inlet 90 into the treating space 18 by an appropriate air moving mechanism 106, that may be a fan or the like. Within the treating space 18, the incoming air is humidified and directed in a treated state to the outlet 92 from where it is directed back into the surrounding space 20.

The treating space 18 is partitioned by a dividing wall 108 on the main housing part 82 into separate chambers 110, 112, respectively below and above the dividing wall 108. The chamber 110 is bounded cooperatively by the dividing wall 108, a peripheral wall 114 on the main housing part 82, and the bottom housing part/wall 86. The inlet 90 is defined by a grill-type arrangement on the bottom housing part/wall 86.

The main housing part 82 is preferably formed as a molded plastic piece. Integrally molded into the body of the housing part 82 is a flow guide wall assembly 116 that defines an air flow passage at 118 that communicates incoming air from the chamber 110 upwardly to the chamber 112. The flow guide wall assembly 116 consists of vertically extending and spaced flow guide walls 120, 122 and a guide wall section 124 connecting therebetween with a curved inside surface 126 that diverts incoming air out of a straight vertical path and into the chamber 112.

Located at least partially within the air flow passage 118 is a heat sink assembly 128 including a metal heat sink component/bracket 130. The heat sink component/bracket 130 is mounted to reside within the air flow that is funneled from the chamber 110 into the restricted area of the air flow passage 118, whereby a substantial volume of incoming air flows against and past the heat sink component/bracket 130. Through this arrangement, the heat sink component/bracket 130 is cooled during operation. The transistor 100, which is attached in heat exchange relationship with the heat sink component/bracket 130, can thus be maintained at a safe operating temperature.

More particularly, the heat sink component/bracket 130 has a body 132 that may be formed from a single piece of metal, such as aluminum, or the like. The body 132 could be bent from sheet stock, or cast, into the depicted shape. The body 132 has an overall U-shaped configuration with spaced legs 134, 136 joined together by a base/interconnecting wall 138. The wall 138 has an offset center portion 140 that is configured so that the heat sink component/bracket 130 is shaped as the letter "W".

The width of the center wall portion 140 is adequate to mount the transistor 100 facially thereto in heat exchange relationship. More specifically, the transistor 100 has a flat surface 142 that is facially engaged with a flat surface 144 on the center wall portion 140 on one side 146 of the wall 138. The "W" shape of the heat sink component/bracket 130 creates an air flow space at 148 on the side 150 of the wall 138 opposite to the side 146. A substantial volume of air is thus forced through the air flow space 148, thereby cooling the heat sink component/bracket 130. The engaging/complementary surfaces 142, 144 on the transistor 100 and heat sink component/bracket 130 are directly engaged over a substantial area to facilitate heat exchange between the transistor 100 and heat sink component/bracket 130. The surfaces 142, 144 need not be flat, so long as they are complementary to have a substantial areal contact.

The heat sink component/bracket 130 has a width W between the legs 134, 136 designed to substantially fully, and more preferably fully, span the distance D between facing surfaces 152, 154 on the guide walls 120, 122, respectively, bounding the air flow passage 118. Through this arrangement, the heat sink component/bracket 130 can be made so that is must be slightly narrowed/compressed by a widthwise squeezing action to allow it to fit within the air flow passage 118. Once the heat sink component/bracket 130 is put in place between the guide walls 120, 122, the compacting force can be released, whereupon restoring forces in the heat sink component/bracket 130 urge the legs 134, 136 into a frictional holding position against the wall surfaces 152, 154.

Figure 13:
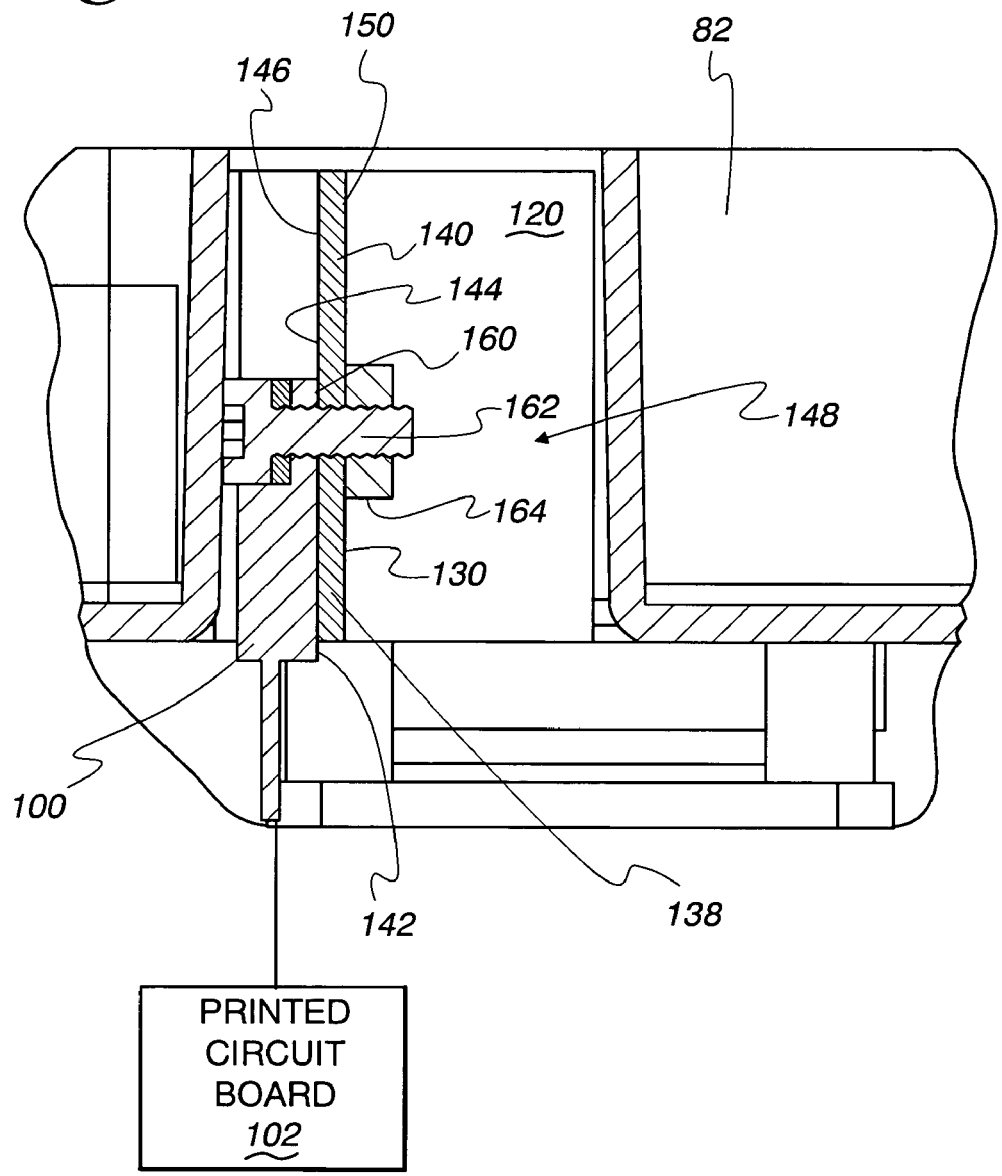
FIG. 13 is an enlarged, cross-sectional view of the heat sink assembly taken along line 13-13 of FIG. 9.

Alternatively, fixed mounting arrangements might be used to secure the heat sink component/bracket 130 in the operative position of FIGS. 9, 10 and 13. Regardless of how the heat sink component/bracket 130 is configured, it can be moved into its operative position through a generally rectangular opening 156 in the dividing wall 108 in the direction of the arrow 158 shown in FIG. 8.

In this embodiment, the transistor 100 has an integral mounting tab 160. A bolt 162 can be directed through the mounting tab 160 and wall portion 140 and secured by a nut 164 to thereby allow the transistor 100 to be fixedly mounted and positively held facially against the center wall portion 140.

With the above arrangement, the heat sink assembly 128 is cooled by air moving into and through the treating space 18 so that it is not required to be directly exposed to any fluid in the receptacle 22. No metal part on the heat sink assembly 128 needs to be directly exposed to the water staged in the receptacle 94.

More particularly, the nebulizer 98 is mounted at a location spaced from the heat sink component/bracket 130. The nebulizer 98 is mounted to the dividing wall in a manner similar to how the nebulizer 46 is mounted in the prior art apparatus 30. That is, the dividing wall 108 has a recessed annular seat 166 that closely accepts the nebulizer 98, which is directed upwardly thereinto. The nebulizer 98 has a surrounding, annular seal 168 extending around the component 98, that nests within the seat 166.

A mounting plate 170 is secured by a fastener 172 to the bottom of the dividing wall 108 and captively holds the nebulizer 98 thereagainst.

Figure 6:
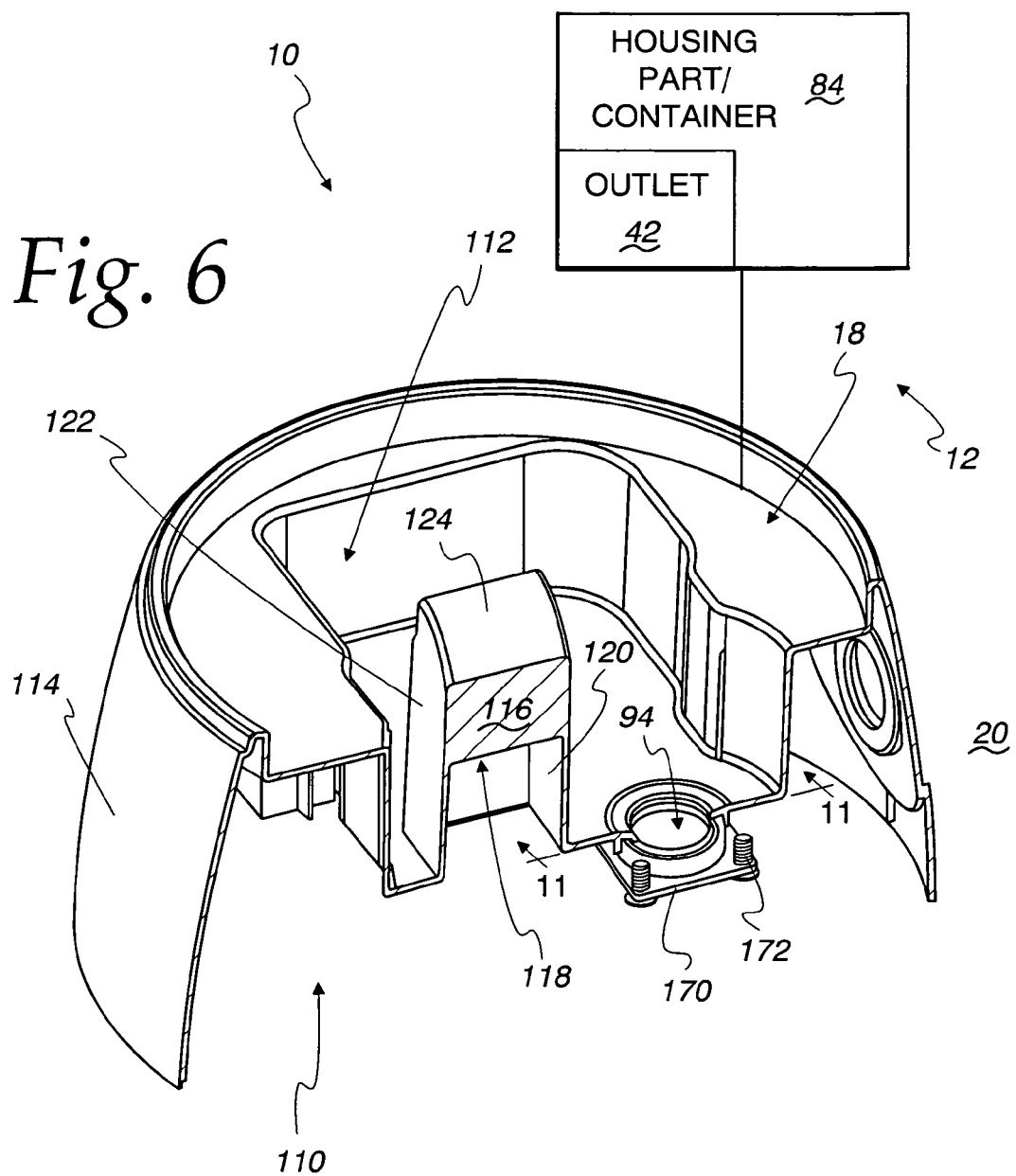
FIG. 6 is a fragmentary, top, partially schematic, perspective view of one specific form of the inventive apparatus, corresponding to that shown schematically in FIG. 1.
Figure 11:
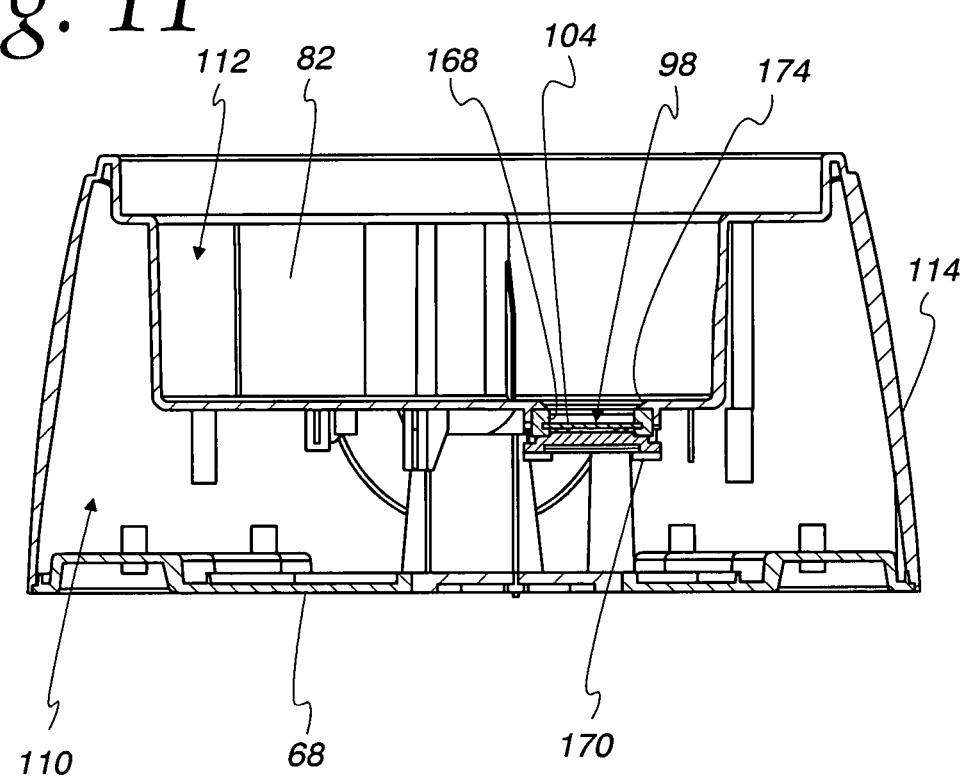
FIG. 11 is a cross-sectional view of the apparatus taken along line 11-11 of FIG. 6.
Figure 12:
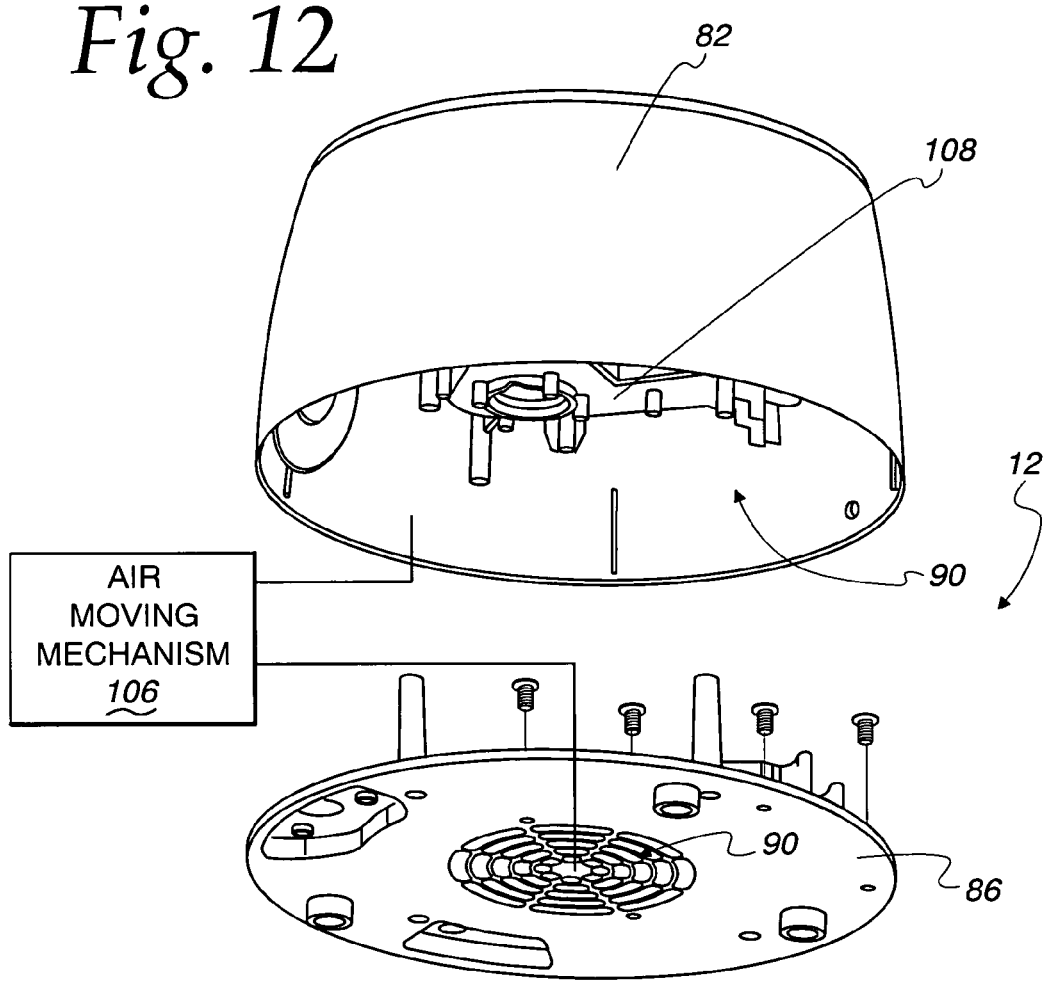
FIG. 12 is an exploded, perspective view of a portion of the apparatus in FIGS. 5-11.

As can be seen in FIGS. 6 and 11, the receptacle 94 is bounded by a surrounding edge 174 on the dividing wall 108, the annular seal 168, and the main nebulizer component 104. Accordingly, no metal parts associated with the heat sink component/bracket 130 are required to be directly exposed to water, or other fluid, that might be altered by the agitated fluid during operation of the apparatus 10. There is no need to paint the metal heat sink component/bracket 130 since it is out of a user's view, even with the housing part/container 84 separated. Thus, there is no issue with respect to fading or flaking paint or any other compromise of the exposed regions of the heat sink component/bracket 130.

The invention contemplates many variations from the basic structure described above. While the heat generating component has been characterized as a transistor, one or more other electronic components might be cooled to be at a safe operating temperature through the heat sink component/bracket 130 together with, or instead of, the transistor 100.

The foregoing disclosure of specific embodiments is intended to be illustrative of the broad concepts comprehended by the invention.

The invention claimed is:

1. An apparatus for delivering humidified air to a surrounding space, the apparatus comprising:
    a housing defining at least one space within which incoming air is treated, a receptacle for a supply of fluid, and an outlet through which treated air is supplied to the surrounding space,
    a plurality of operating components supported by the housing,
    the plurality of components comprising a nebulizer that causes fluid in the receptacle to become entrained in incoming air,
    the treated air with the entrained fluid flowing through the housing outlet to the surrounding space,
    the nebulizer operable by electronic components including at least one electronic component that generates heat as the nebulizer is operated,
    the apparatus further comprising a heat sink assembly on the housing in heat exchange relationship with the at least one electronic heat generating component,
    the heat sink assembly: a) cooled by air moving into and through the at least one housing space; and b) not directly exposed to fluid in the receptacle.

2. The apparatus for delivering humidified air to a surrounding space according to claim 1 further in combination with a supply of water in the housing receptacle.

3. The apparatus for delivering humidified air to a surrounding space according to claim 1 wherein the at least one electronic component comprises a transistor electrically connected to a printed circuit board.

4. The apparatus for delivering humidified air to a surrounding space according to claim 3 wherein the transistor and heat sink assembly have complementary surfaces that are directly engaged over a substantial area to facilitate heat exchange between the transistor and heat sink assembly.

5. The apparatus for delivering humidified air to a surrounding space according to claim 1 wherein the heat sink assembly comprises a bracket with a wall with first and second sides, the at least one electronic component is attached to the first side of the bracket wall and there is an air flow space at the second side of the bracket wall.

6. The apparatus for delivering humidified air to a surrounding space according to claim 5 wherein the housing defines an air flow passage within which the bracket resides.

7. The apparatus for delivering humidified air to a surrounding space according to claim 6 wherein the air flow passage is bounded by spaced flow guide walls and the heat sink assembly spans substantially fully between the spaced flow guide walls.

8. The apparatus for delivering humidified air to a surrounding space according to claim 6 wherein the air flow passage is bounded by spaced flow guide walls and the bracket has an overall U-shaped configuration with spaced legs that are located one each at the spaced flow guide walls.

9. The apparatus for delivering humidified air to a surrounding space according to claim 5 wherein the bracket has a "W" shape with spaced legs and the bracket wall to which the electronic component is attached extends transversely to the spaced legs.

10. The apparatus for delivering humidified air to a surrounding space according to claim 5 wherein the at least one electronic component is secured by a fastener to the bracket.

11. The apparatus for delivering humidified air to a surrounding space according to claim 1 wherein the at least one space comprises first and second chambers separated by a dividing wall, there is an air flow passage that communicates incoming air from the first chamber to the second chamber, and the heat sink assembly resides within the air flow passage.

12. The apparatus for delivering humidified air to a surrounding space according to claim 11 wherein the receptacle for the supply of fluid is defined on the dividing wall.

13. The apparatus for delivering humidified air to a surrounding space according to claim 12 wherein the nebulizer is mounted on the dividing wall.

14. The apparatus for delivering humidified air to a surrounding space according to claim 11 wherein the plurality of operating components comprises an air moving mechanism in the first chamber that causes: a) incoming air to flow into and from the first chamber to the second chamber; and b) humidified air to flow from the second chamber to and through the housing outlet to the surrounding space.

15. The apparatus for delivering humidified air to a surrounding space according to claim 12 wherein the nebulizer bounds at least a part of the receptacle for the supply of liquid.

16. The apparatus for delivering humidified air to a surrounding space according to claim 11 wherein the dividing wall defines a recessed seat for the nebulizer.

17. The apparatus for delivering humidified air to a surrounding space according to claim 16 wherein the apparatus further comprises a mounting plate that is secured to the dividing wall and captively maintains the nebulizer against the dividing wall within the recessed seat.

18. The apparatus for delivering humidified air to a surrounding space according to claim 17 wherein the housing further comprises a bottom wall that bounds the first chamber in conjunction with the dividing wall.

19. The apparatus for delivering humidified air to a surrounding space according to claim 18 wherein the housing has an air inlet formed in the bottom wall.

20. An apparatus for delivering humidified air to a surrounding space, the apparatus comprising:
   a housing defining at least one space within which incoming air is treated, a receptacle for a supply of fluid, and an outlet through which treated air is supplied to the surrounding space,
   a plurality of operating components supported by the housing,
   the plurality of components comprising a nebulizer that causes fluid in the receptacle to become entrained in incoming air,
   the treated air with the entrained fluid flowing through the housing outlet to the surrounding space,
   the nebulizer operable by electronic components including at least one electronic component that generates heat as the nebulizer is operated,
   the apparatus further comprising a heat sink assembly on the housing in heat exchange relationship with the at least one electronic heat generating component,
   the heat sink assembly: a) cooled by air moving into and through the at least one housing space; and b) having no metal part directly exposed to fluid in the receptacle.

* * * * *